US011499203B2

(12) United States Patent
Verleene

(10) Patent No.: US 11,499,203 B2
(45) Date of Patent: Nov. 15, 2022

(54) METHOD FOR THE HEAT TREATMENT OF A PART MADE FROM MARAGING STEEL

(71) Applicant: COMPAGNIE GENERALE DES ETABLISSEMENTS MICHELIN, Clermont-Ferrand (FR)

(72) Inventor: Stephanie Verleene, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 145 days.

(21) Appl. No.: 16/955,487

(22) PCT Filed: Dec. 14, 2018

(86) PCT No.: PCT/FR2018/053308
§ 371 (c)(1),
(2) Date: Jun. 18, 2020

(87) PCT Pub. No.: WO2019/122635
PCT Pub. Date: Jun. 27, 2019

(65) Prior Publication Data
US 2021/0002737 A1 Jan. 7, 2021

(30) Foreign Application Priority Data
Dec. 19, 2017 (FR) ...................................... 1762494

(51) Int. Cl.
C21D 6/00 (2006.01)
B22F 10/00 (2021.01)
(Continued)

(52) U.S. Cl.
CPC .............. C21D 6/008 (2013.01); B22F 5/007 (2013.01); B22F 10/00 (2021.01); C21D 6/001 (2013.01);
(Continued)

(58) Field of Classification Search
CPC .. C21D 6/008; C21D 6/001; C21D 2211/008; C21D 2211/001; C21D 2211/004;
(Continued)

(56) References Cited

U.S. PATENT DOCUMENTS 10,232,602 B2  3/2019  Bessac et al.
2013/0065073 A1  3/2013  Fuwa
(Continued)

FOREIGN PATENT DOCUMENTS

CN  106825566 A  6/2017
CN  107116224 A  9/2017
(Continued)

OTHER PUBLICATIONS

"11—Steels for aircraft structures", Introduction to aerospace materials, pp. 232-250 (2012), retrieved from the internet: https://www.sciencedirect.com/topics/chemistry/maraging-steel, DOI: 10.1533/9780857095152.232. XP009512400.
(Continued)

Primary Examiner — Anthony M Liang
Assistant Examiner — Danny N Kang
(74) Attorney, Agent, or Firm — Venable LLP

(57) ABSTRACT

A method for the heat treatment of a part made of maraging steel, which part is obtained by selective laser melting, it comprises the steps of: heating the said part made of maraging steel from ambient temperature T0 to a maximum temperature Tmax of between 600° C. and 640° C., maintaining the said maximum temperature Tmax for a duration of between 5 hours and 7 hours, and rapidly cooling the said part.

8 Claims, 2 Drawing Sheets

(51) Int. Cl.
*B22F 5/00* (2006.01)
*C22C 38/00* (2006.01)
*C22C 38/52* (2006.01)
*B33Y 80/00* (2015.01)
*B33Y 70/00* (2020.01)
*C22C 38/02* (2006.01)
*C22C 38/06* (2006.01)
*C22C 38/42* (2006.01)
*C22C 38/44* (2006.01)
*C22C 38/50* (2006.01)

(52) U.S. Cl.
CPC ............ *C22C 38/002* (2013.01); *C22C 38/02* (2013.01); *C22C 38/06* (2013.01); *C22C 38/42* (2013.01); *C22C 38/44* (2013.01); *C22C 38/50* (2013.01); *C22C 38/52* (2013.01); *B22F 2301/35* (2013.01); *B33Y 70/00* (2014.12); *B33Y 80/00* (2014.12); *C21D 2211/008* (2013.01)

(58) Field of Classification Search
CPC . C21D 1/26; C21D 6/007; C21D 6/02; C21D 9/0068; B22F 5/007; B22F 10/00; B22F 2301/35; B22F 10/20; B22F 2003/248; C22C 38/002; C22C 38/02; C22C 38/06; C22C 38/42; C22C 38/44; C22C 38/50; C22C 38/52; C22C 38/08; C22C 38/10; C22C 38/12; B33Y 70/00; B33Y 80/00; Y02P 10/25
See application file for complete search history.

(56) References Cited

U.S. PATENT DOCUMENTS

| | | | |
|---|---|---|---|
| 2015/0064048 A1 | 3/2015 | Bessac et al. | |
| 2017/0356070 A1* | 12/2017 | Miyamura | ............ C22C 38/004 |
| 2018/0087123 A1* | 3/2018 | Perrin Guerin | ....... C22C 38/105 |
| 2018/0297306 A1* | 10/2018 | Ishihara | ................ B29C 33/005 |
| 2020/0338790 A1 | 10/2020 | Verleene | |

FOREIGN PATENT DOCUMENTS

| | | | |
|---|---|---|---|
| DE | 102015202328 A1 | 8/2016 | |
| FR | 2 987 293 A1 | 8/2013 | |
| WO | WO-2016170519 A1 * | 10/2016 | ............... C22B 9/18 |
| WO | WO-2017094288 A1 * | 6/2017 | ............. B29C 35/02 |

OTHER PUBLICATIONS

K. Rohrbach, et al., "Maraging Steels", Properties and Selection: Irons, Steels & High Performance Alloys, Americaon Society for Metals, pp. 793-800 (1990).

International Search Report dated Apr. 3, 2019, in corresponding PCT/FR2018/053308 (7 pages).

J. Mutua, et al., "Optimization of selective laser melting parameters and influence of post heat treatment on microstructure and mechanical properties of maraging steel", Materials and Design 139 (2018) 486-497.

J. Milovanovic, et al., "Metal Laser Sintering for Rapid Tooling in Application to Tyre Tread Pattern Mould", Sintering—Methods and Products, InTech, pp. 73-90 (2012).

R. Casati, et al., "Aging Behaviour and Mechanical Performance of 18-Ni 300 Steel Processed by Selective Laser Melting", Metals 2016, 6, 218.

J. Shutian, "Metallographic Structure and Properties of Ni18Co9Mo5Ti Maraging Steel"; Journal of Solid Rocket Technology, vol. 18, No. 1, pp. 69-76 (1995) (with English abstract).

* cited by examiner

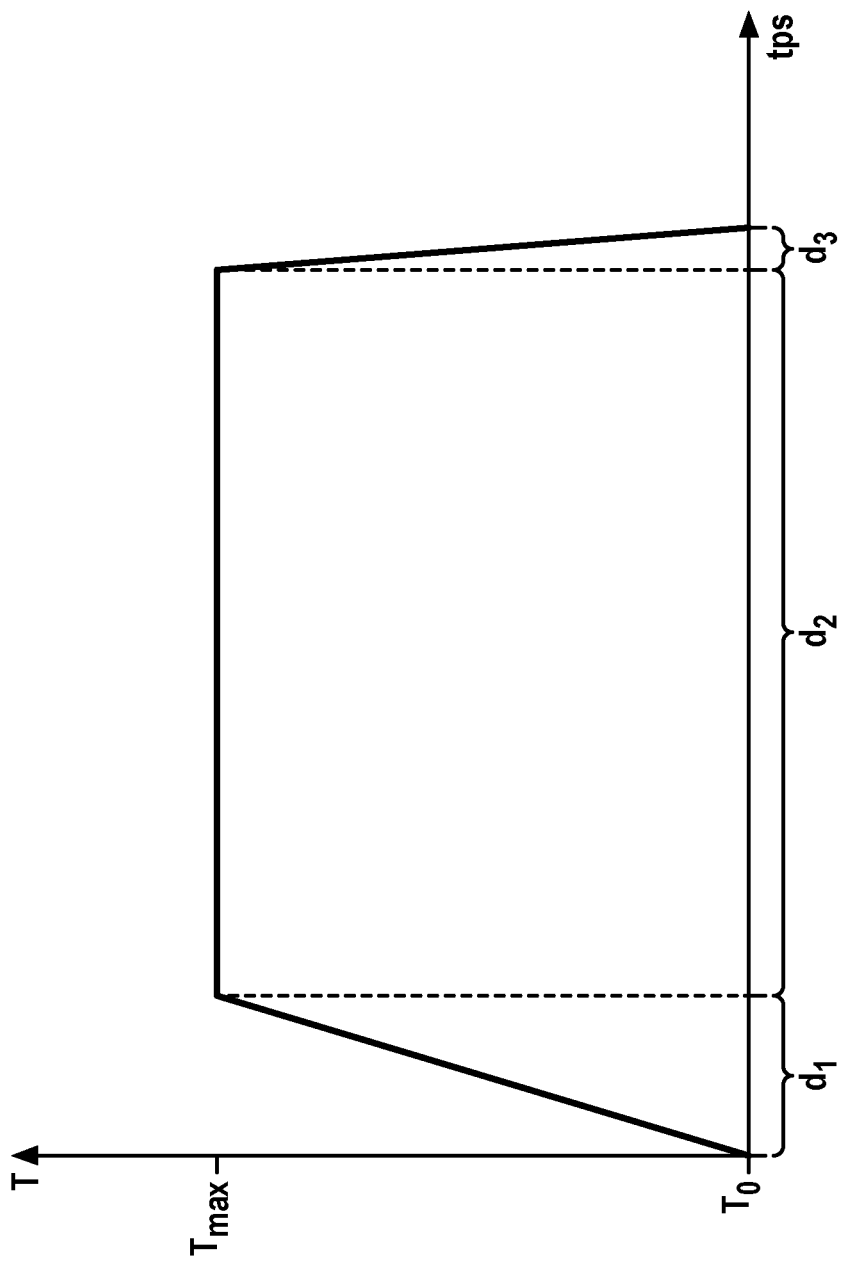

METHOD FOR THE HEAT TREATMENT OF A PART MADE FROM MARAGING STEEL

GENERAL TECHNICAL FIELD

The invention falls within the field of parts made from maraging steel, which are obtained by additive manufacturing, more specifically by selective laser melting (SLM).

The invention relates more specifically to the heat treatment of such parts, which are intended subsequently to come into contact with cast or injection-moulded aluminium.

The invention also relates to a method for manufacturing an aluminium product, which consists in pouring or injection-moulding aluminium around a part that has undergone the said heat treatment.

Finally, the invention finds a particular application to the manufacture of an aluminium mould for curing and vulcanizing a tyre, in which at least one such part made from maraging steel, taking the form of a thin blade, is used to form the grooves in the tread of the tyre.

PRIOR ART

As an aide-memoire, it will be recalled that "selective laser melting" is an additive-manufacturing method which consists in melting and then welding together thin layers of metallic powders by scanning using a laser beam, in order to obtain a part.

When this method is employed for the manufacture of parts made of maraging steel (for example the aforementioned thin blades), mini tempering operations take place, as a result of the temperature increase during the laser melting, followed by the rapid cooling. These mini tempering operations do not make it possible to create a clearly-defined crystal structure with precipitates, namely a material structure that is uniform and well-organized, but rather lead to a heterogeneous hybrid state with the segregation of chemical elements, namely local impoverishment and local enrichment of chemical elements.

During the manufacture of a tyre curing and vulcanizing mould, one method that can be used involves manufacturing a first pattern comprising the grooves of the tread of the future tyre, and then, from this first pattern, manufacturing a mould of inverse shape from a flexible material (for example from silastene) and then, from this mould, making a second pattern from a friable material corresponding to the profile of the tyre and then, from this second pattern, making the definitive mould.

This definitive mould is obtained by pouring aluminium around thin blades made of maraging steel which have been obtained using the aforementioned selective laser melting method, these thin blades being shaped to conform to the shape of the grooves of the tread. The pouring of the aluminium around these thin blades gives rise to a further increase in the temperature thereof, and amplifies the segregation of chemical elements.

The nonuniform microstructure and these segregations make the thin blade made of maraging steel fragile and brittle, notably with a drop in the elongation of the material, making it not very strong, once the elastic-deformation zone has been crossed.

A method for the heat treatment of a maraging steel is known from the site www.aircraftmaterials.com/data/nickel/C300.html, and consists in heating it up to a temperature of 816° C., and then reducing the temperature to an annealing temperature of 482° C. in order to achieve a peak of maximum hardness. However, such a heat treatment has the effect of making the steel more fragile still, and goes against the desired effect.

Document FR 2 987 293 discloses a method for manufacturing three-dimensional objects, and the apparatus for implementing this method. This method consists in depositing a first layer of powder on a support, melting it using a laser beam, then subjecting it to a heat treatment. This method is thus repeated for each layer. However, aside from the fact that this heat treatment is applied to each layer and not to the finished product, it is carried out in temperature ranges from 400° C. to 500° C., which does not provide a solution to the problems that the invention is intended to address.

SUMMARY OF THE INVENTION

The object of the invention is to overcome the aforementioned disadvantages of the prior art.

The object of the invention is to propose a heat treatment for a part made of maraging steel, which part is obtained by selective laser melting (notably a thin blade), before it is brought into contact with cast or injection-moulded aluminium, for example before it is inserted in an aluminium mould for the curing and vulcanizing of tyres, this treatment having the objective of making it more ductile and more resilient.

To this end, the invention relates to a method for the heat treatment of a part made of maraging steel, which part is obtained by selective laser melting, the said steel comprising a steel containing a percentage of carbon less than or equal to 0.03%, a nickel content of between 17% and 19%, a cobalt content of between 8.5% and 9.5%, a molybdenum content of between 4.5% and 5.2%, a titanium content of between 0% and 0.8%, an aluminium content of between 0% and 0.15%, a chromium content of between 0% and 0.5%, a copper content of between 0% and 0.5%, a silicon content of between 0% and 0.1%, a manganese content of between 0% and 0.1%, a sulfur content of between 0% and 0.01%, a phosphorus content of between 0% and 0.01%, the remainder being iron, all these percentages being expressed by weight with respect to the total weight of the part.

According to the invention, this method comprises the steps of:
heating the said part made of maraging steel from ambient temperature T0 to a maximum temperature Tmax of between 600° C. and 640° C.,
maintaining the said maximum temperature Tmax for a duration of between 5 hours and 7 hours,
cooling the said part.

By virtue of these features of the invention, it is found that the part made of maraging steel thus treated is far more ductile, which means to say that it can be deformed to a greater extent without breaking, and is far more resilient, which means to say has a better capacity for absorbing energy. Such a treatment also makes it possible to increase the elongation of the part.

The invention also relates to the use of at least one part made of maraging steel, which part is obtained using the aforementioned method for the manufacture of a product made of aluminium.

According to the invention, this use comprises the steps of:
placing the said at least one part made of maraging steel in a die cavity, and pouring or injecting aluminium into the said die cavity around the said part or parts made of maraging steel, so as to obtain the said aluminium product.

For preference, the said aluminium product is a tyre curing and vulcanizing mould or a mould segment, the said part made of maraging steel is a thin blade for forming the grooves in the tread of the said tyre and the aluminium is poured around the said thin blade or blades in order to obtain the said mould.

BRIEF DESCRIPTION OF THE FIGURES

Further features and advantages of the invention will become apparent from the description which will now be given thereof, with reference to the appended drawings which depict, by way of non-limiting example, one possible embodiment thereof.

In these drawings:

FIG. 3 is a depiction, in graph form, of how the temperature changes as a function of time, over the course of the various steps of the heat treatment method according to the invention.

DETAILED DESCRIPTION OF THE INVENTION

The heat treatment method according to the invention seeks to treat a part made of maraging steel, which part is obtained by selective laser melting.

The maraging steel employed is a steel containing, in the conventional way, a percentage of carbon less than or equal to 0.03%, a nickel content of between 17% and 19%, a cobalt content of between 8.5% and 9.5%, a molybdenum content of between 4.5% and 5.2%, a titanium content of between 0% and 0.8%, an aluminium content of between 0% and 0.15%, a chromium content of between 0% and 0.5%, a copper content of between 0% and 0.5%, a silicon content of between 0% and 0.1%, a manganese content of between 0% and 0.1%, a sulfur content of between 0% and 0.01%, a phosphorus content of between 0% and 0.01%, the remainder being iron, (these percentages being expressed by weight with respect to the total weight of the product). This steel has a martensitic structure.

This steel exhibits the following properties, after solution heat treatment followed by ageing: high hardness (>550 Hv), good properties under tension (Re>1500 MPa, Rm>1600 MPa) and in terms of fatigue, low thermal expansion coefficient less than or equal to $10.2\times10^{-6}$ m/m. °C.

When this maraging steel has been obtained by a method of selective laser melting (SLM), namely by an additive manufacturing method, it also has specific properties inherent to additive manufacturing without a post-heat treatment, such as a very fine microstructure (brought about by the significant thermal gradients associated with this method), which is beneficial to certain properties such as the elastic limit (>800 MPa), the load at break (>900 MPa) and the hardness (>380 Hv).

As set out hereinabove, one particular example of an application of the invention is the manufacture of a tyre curing and vulcanizing mould.

Figure 2:
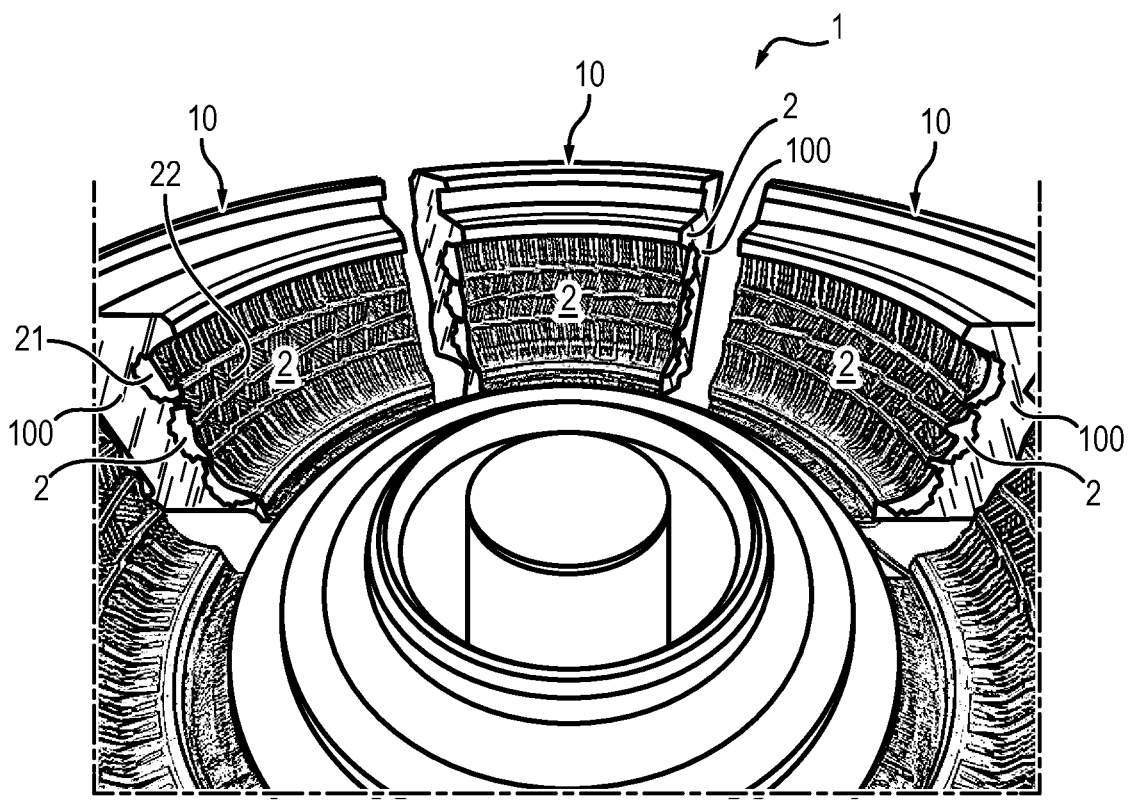
FIG. 2 is one exemplary embodiment of a tyre curing and vulcanizing mould equipped with at least one of the aforementioned thin blades.

FIG. 2 shows one exemplary embodiment of such a mould 1, of which only part is depicted. This mould 1, of annular overall shape, is made up of a plurality of curved segments 10, shaped as portions of an annulus in the shape of arcs of a circle, which are intended to be assembled in order to form the entire mould 1. Each mould segment 10 has, on its concave interior surface, several thin blades 2, shaped to exhibit the shape of the grooves in the tread.

Figure 1:
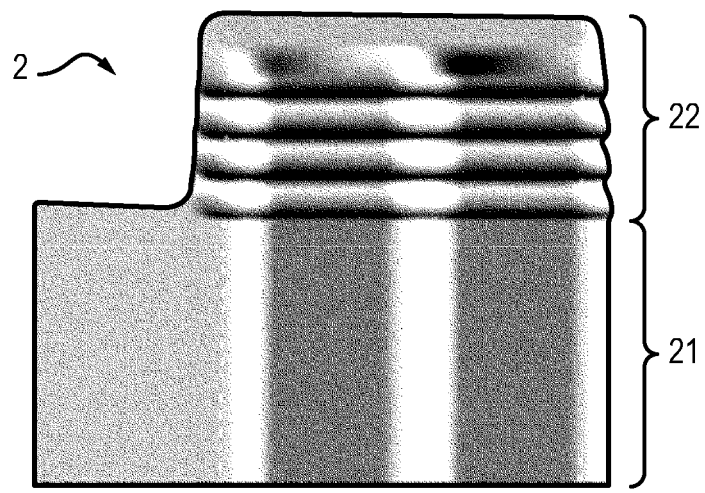
FIG. 1 is a perspective view of one exemplary embodiment of a thin blade made of steel for forming grooves in the treads of tyres.

An exemplary embodiment of such a thin blade 2 can be seen by referring to FIG. 1.

The thin blade 2 has a wavy shape. It comprises two parts, namely a part 21 referred to as "interior" because it is intended to be embedded in the aluminium that constitutes the rear 100 of a mould segment 10, and a part 22 referred to as "exterior" because it is intended to project from the rear of the mould segment towards the centre of the mould 1.

It is therefore, for example, this thin blade 2 made of maraging steel and obtained by selective laser melting that will undergo the heat treatment according to the invention.

This method will now be described with reference to FIG. 3.

This heat treatment is preferably carried out by placing the part made of maraging steel that is to be treated in a vacuum furnace. It is also possible to use a furnace under an inert atmosphere, for example of argon or of nitrogen.

This part is heated for a heating time $d_1$, during which it transitions from ambient temperature $T_0$ to a maximum temperature $T_{max}$. It is then held at said maximum temperature $T_{max}$ for a time duration $d_2$. Finally, it is cooled rapidly in a time $d_3$, during which it makes the transition from the maximum temperature $T_{max}$ to the temperature $T_0$ or substantially $T_0$.

The rate of heating $V_h$ is equal to $(T_{max}-T_0)/d_1$. This rate of heating $V_h$ is preferably comprised between 5° C./min and 10° C./min, and more preferably still, it is 7.5° C./min.

The initial temperature $T_0$ corresponds to ambient temperature, namely around 20° C.

The maximum temperature $T_{max}$ is comprised between 600° C. and 640° C., preferably between 610° C. and 630° C., and more preferably still, equal to 620° C.

The duration $d_2$ of the time spent held at this maximum temperature $T_{max}$ is comprised between 5 and 7 hours, more preferably still, a time of 6 hours or around 6 hours.

The rate of cooling $V_c$ is equal to $(T_{max}-T_0)/d_3$. This rate of cooling $V_c$ is preferably comprised between 420° C./min and 480° C./min, is preferably comprised between 440° C./min and 460° C./min, and more preferably still, it is equal to 450° C./min.

The rapid cooling in the vacuum heat treatment furnace occurs with the vacuum eliminated, namely under air or by injecting cooled inert gases, such as nitrogen and hydrogen for example, for example as a rotating flow. These two inert gases specifically allow a rapid exchange of heat with the part treated in the furnace.

When the method is performed in a furnace under an inert atmosphere, all of the steps (temperature increase and decrease) are performed under an atmosphere of inert gas(es).

At the end of the heat treatment according to the invention, the part made of maraging steel obtained contains between 45% and 65% austenite and between 55% and 35% martensite.

The residual presence of $Fe_2Mo_6$ and of $M_6C$ carbide precipitates is also noted.

In this instance in which the aforementioned heat treatment is applied to thin blades 2 for the creation of the tread grooves, it may be carried out while the thin blades are still on their manufacturing platen, thereby making it possible to avoid deformation. They can also be detached and placed in baskets that can go into the furnace.

The invention also relates to a method for manufacturing a metal product, which comprises the steps consisting in general in positioning at least one part, made of maraging steel that has undergone the aforementioned heat treatment method, in a die cavity and pouring or injecting aluminium around this part so as to obtain the said end product.

In the case of the manufacture of the aforementioned mould 1, the thin blades 2 are placed in a cavity, for example made of plaster, the shape of which is the negative (the reverse image) of the mould 1 or of a segment 10 of this mould.

The outer part 22 of each thin blade 2 is embedded in the plaster. The die cavity is closed and the aluminium is poured or injected into it. Once the aluminium has cooled, the plaster die is broken away, yielding the aluminium mould 1 or mould segment 10 in which the interior part 21 is embedded in the aluminium and from which the exterior part 22 of the thin blades 2 projects.

Tests were conducted to measure the elongation at break A of a part made of maraging steel that has undergone the various methods. These results are summarized in Table 1 below.

TABLE 1

| Various method steps to which the parts are subjected | Elongation at break A (%) |
| --- | --- |
| SLM | 6% max |
| SLM + cast alu | 0.2% to 1.5% |
| SLM + HT | 6% max |
| SLM + HT + cast alu | 5% max |

SLM = part made from maraging steel obtained at the end of a selective laser melting (SLM) method.
HT = heat treatment according to the invention.
Cast alu = cast with aluminium poured at a temperature of around 750° C.

The results in Table 1 show the positive effect that the heat treatment has on the fatigue behaviour of the part Specifically it may be noted that if the treatment of pouring cast aluminium is performed directly after the part made of maraging steel has been obtained using the SLM treatment, without the heat treatment of the invention (Row 2 of the table), the elongation at break A is greatly reduced.

By contrast, the heat treatment according to the invention makes it possible to keep the elongation at break A identical or substantially identical to what it was on the original part as obtained at the end of the selective laser melting treatment. Furthermore, when the pouring of the cast aluminium is performed after the heat treatment according to the invention, it is found that the elongation at break A is simply reduced slightly by comparison with its original value.

Additional tests conducted on the tensile properties of elastic limit and load at break show that these values remain at least equivalent to those obtained on the part obtained by SLM, if the heat treatment according to the invention is performed between the aforementioned SLM step and the pouring of the aluminium.

The heat treatment method according to the invention also has a beneficial effect on the shock resistance of the parts obtained.

The invention claimed is:

1. A method of manufacturing a tire curing and vulcanizing mold or mold segment made of aluminium, the method comprising:
    fabricating, by selective laser melting, at least one thin blade for forming grooves in a tread of the tire, the thin blade being made of a maraging steel comprising a carbon content of less than or equal to 0.03%, a nickel content of between 17% and 19%, a cobalt content of between 8.5% and 9.5%, a molybdenum content of between 4.5% and 5.2%, a titanium content of between 0% and 0.8%, an aluminium content of between 0% and 0.15%, a chromium content of between 0% and 0.5%, a copper content of between 0% and 0.5%, a silicon content of between 0% and 0.1%, a manganese content of between 0% and 0.1%, a sulfur content of between 0% and 0.01%, a phosphorus content of between 0% and 0.01%, the remainder being iron and all percentages being expressed by weight with respect to the total weight of the thin blade;
    heating the at least one thin blade from ambient temperature To to a maximum temperature $T_{max}$ of between 600° C. and 640° C.;
    maintaining the maximum temperature $T_{max}$ for a duration of between 5 hours and 7 hours;
    cooling the at least one thin blade;
    placing the thus-obtained at least one thin blade in a die cavity for forming the tire curing and vulcanizing mold or mold segment; and
    pouring or injecting aluminium into the die cavity around the at least one thin blade so as to obtain the aluminium tire curing and vulcanizing mold or mold segment.

2. The method according to claim 1, wherein the maximum temperature $T_{max}$ is between 610° C. and 630° C.

3. The method according to claim 1, wherein the maximum temperature $T_{max}$ is maintained for a duration of 6 hours or of around 6 hours.

4. The method according to claim 1, wherein a rate of cooling $V_c$ is between 420° C./min and 480° C./min.

5. The method according to claim 4, wherein the rate of cooling $V_c$ is between 440° C./min and 460° C./min.

6. The method according to claim 1, wherein a rate of heating $V_h$ is between 5° C./min and 10° C./min.

7. The method according to claim 1, wherein the heating of the at least one thin blade is carried out in a vacuum furnace.

8. The method according to claim 1, wherein the cooling is carried out under a rotating flow of cooled inert gases or under air.

* * * * *